United States Patent [19]

Nagaoka

[11] 3,835,243

[45] Sept. 10, 1974

[54] CIRCUITRY FOR REDUCING EFFECTS OF NOISE ON COLOR IMAGE

[75] Inventor: Yoshitomi Nagaoka, Osaka, Japan

[73] Assignee: Matsushita Electric Industrial Co. Ltd., Osaka, Japan

[22] Filed: Apr. 3, 1973

[21] Appl. No.: 347,372

[30] Foreign Application Priority Data

| | | |
|---|---|---|
| Apr. 7, 1972 | Japan | 47-35474 |
| July 10, 1972 | Japan | 47-69322 |
| July 10, 1972 | Japan | 47-69323 |
| Oct. 19, 1972 | Japan | 47-105102 |
| Oct. 19, 1972 | Japan | 47-105103 |

[52] U.S. Cl. .......... 178/5.4 R, 178/DIG. 12

[51] Int. Cl. .......... H04n 9/12

[58] Field of Search... 178/DIG. 12, DIG. 19, 5.4 R, 178/5.4 HE, 5.4 BT

[56] References Cited

UNITED STATES PATENTS

| | | | |
|---|---|---|---|
| 3,288,930 | 11/1966 | Johnson | 178/DIG. 19 |
| 3,489,851 | 11/1966 | Melchior | 178/DIG. 19 |
| 3,732,356 | 5/1973 | Matzek | 178/5.4 R |

FOREIGN PATENTS OR APPLICATIONS

| | | | |
|---|---|---|---|
| 866,432 | 3/1971 | Canada | 178/5.4 R |

*Primary Examiner*—Robert L. Richardson
*Attorney, Agent, or Firm*—Wenderoth, Lind & Ponack

[57] ABSTRACT

A picture quality improving apparatus for a color television receiver. A signal detecting means for detecting a specific portion of the color-difference signal which reproduces a high-saturation color on the screen is connected to a nonlinear processing means coupled to the signal detecting means. The processing means reduces the amplitude of the color-difference signal in response to the output signal of the signal detecting means in order to eliminate noise disturbances, decreases in the sharpness and luminance errors appearing in a high-saturation color portion of a picture.

7 Claims, 14 Drawing Figures

CIRCUITRY FOR REDUCING EFFECTS OF NOISE ON COLOR IMAGE

BACKGROUND OF THE INVENTION

1. Field of the Invention

The present invention relates to a picture quality improving apparatus for eliminating noise disturbances, decreases in sharpness and luminance errors produced in a high-saturation color portion of a picture on a color television receiver.

2. Description of the Prior Art

In the present day color television receiver, very annoying noise disturbances appear in a high-saturation color portion of a picture such as a saturated red or a saturated blue. As the noise has a relatively large size in the horizontal direction on the screen, the quality of the picture is greatly degraded.

In addition to the noise disturbances, the saturated color portions suffer from decreases in sharpness and luminance errors, the former of which gives viewers the same effect as so-called "blooming," which is a decrease in sharpness in highlight portions of a picture, and the latter of which are perceived by viewers as extreme enhancements of colors. Although this type of picture quality degradation is one of the most important problems to be solved in television picture quality, the causes thereof have not been made clear yet. Therefore, no effective solutions have been gained up to the present time.

Recently, it has become clear from research by this inventor that these problems are related to the characteristics of color-difference signal demodulators and a color picture tube. The detailed description of the causes and solutions is to be set forth hereinafter.

SUMMARY OF THE INVENTION

It is an object of the present invention to provide a picture quality improving apparatus for reducing noise disturbances which appear in a high-saturation color portion of a television picture.

It is another object of the present invention to provide a picture quality improving apparatus for eliminating decreases in sharpness which are produced in a high-saturation color portion of a reproduced image.

It is a further object of the present invention to provide a picture quality improving apparatus for reducing luminance errors which are reproduced in a high-saturation color portion of an image.

To achieve the foregoing object there is provided a picture quality improving apparatus according to the present invention which comprises signal detecting means for detecting a specific portion of the color-difference signal which produces a high-saturation color portion on the screen, and nonlinear processing means coupled to said signal detecting means for reducing the amplitude of said color-difference signal in response to the output signal of said signal detecting means.

DESCRIPTION OF DRAWINGS

These and other features of the invention will be apparent from the following description of the invention taken in connection with the accompanying drawings, in which.

DESCRIPTION OF PREFERRED EMBODIMENTS

Figure 1:
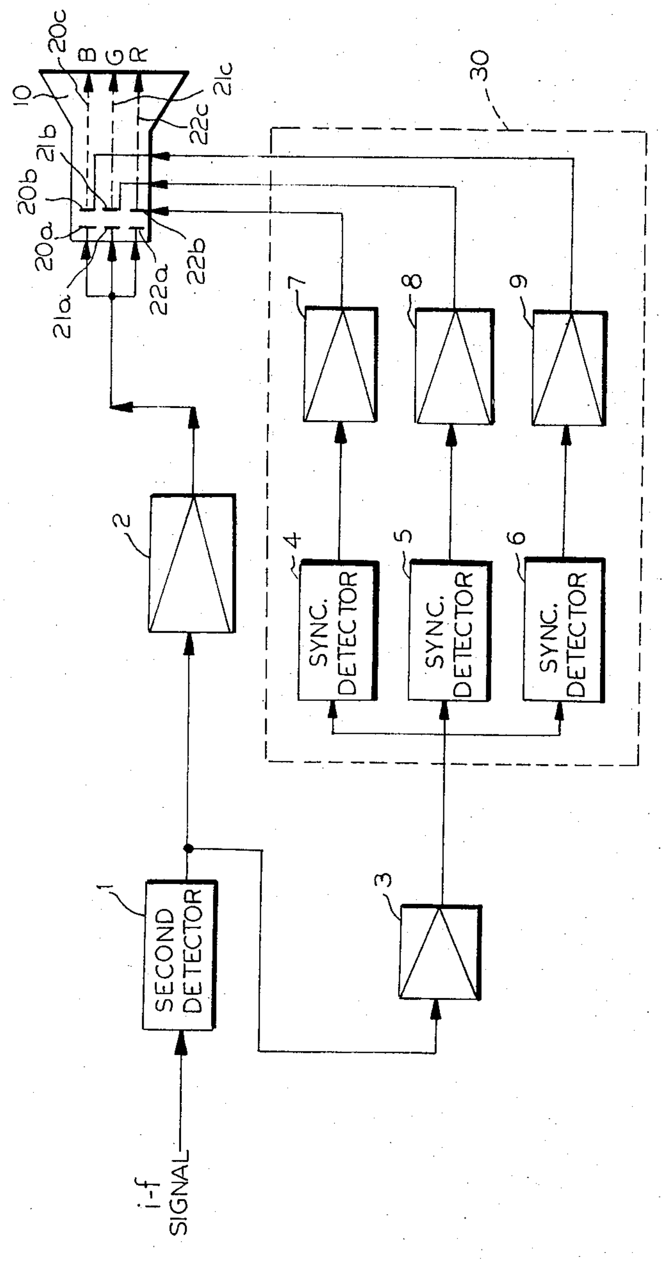
FIG. 1 is a block diagram of a conventional color television receiver.

Turning now to FIG. 1, there is shown a block diagram of a conventional color television receiver which receives NTSC television signals. The second detector 1 detects a composite video signal from an intermediate-frequency(*i-f*) signal. A luminance signal is separated from said composite video signal and amplified by the video amplifier 2, and fed to the cathode electrodes 20*a*, 21*a* and 22*a* of the color picture tube 10. A modulated chrominance signal is separated from said composite video signal, amplified by the band-pass amplifier 3 and fed to the synchronous detectors 4, 5 and 6. Said synchronous detectors 4, 5 and 6 demodulate said modulated chrominance signal and take out R-Y, G-Y and B-Y color-difference signals respectively. Said R-Y, G-Y and B-Y color-difference signals are amplified by the color-difference amplifiers 7, 8 and 9 respectively and fed to the grid electrodes 20*b*, 21*b* and 22*b* of said color picture tube 10 respectively. Said color picture tube 10 produces three electron beams 20*c*, 21*c* and 22*c* which hit the blue, green and red phosphor dots. The phosphors then emit the blue, green and red light outputs which give rise to color sensation in the vision of viewers in accordance with the law of additive color mixture.

Many factors exist which affect the quality of color reproduction, the most important of which are the demodulating characteristics of the color demodulating block 30, that is, the demodulating axes and gains of the R-Y, G-Y and B-Y demodulators, and the chromaticities of the red, green and blue phosphors (three primaries) and reference white of the color picture tube 10. The NTSC standard has defined the chromaticities of the three primaries (hereinafter called "NTSC primaries,") and reference white as follows;

red primary $x = 0.67$, $y = 0.33$ green primary $x = 0.21$, $y = 0.71$ blue primary $x = 0.14$, $y = 0.08$ reference white $x = 0.310$, $y = 0.316$ (Illuminant "C") where $x$ and $y$ are co-ordinates on the 1931 CIE $(x, y)$-chromaticity diagram.

These values are necessary for exact colorimetric reproduction, because the transmitted NTSC signals are optimized for these chromaticities.

In a theoretical consideration, it is assumed that the gain of said video amplifier 2 is unity and reference white is obtained if said three cathode electrodes 20*a*, 21*a* and 22*a* are driven with luminance signals which have equal amplitude and no color-difference signals are fed to said grid electrodes 20*b*, 21*b* and 22*b*. Then, the NTSC demodulator which has the following demodulating axes and gains permits exact colorimetric reproduction if the NTSC primaries and the reference white of Illuminant "C" are used together.

| | Axis | Gain |
|---|---|---|
| R-Y | 90° | 1.1474 |
| G-Y | 236° | 0.7062 |
| B-Y | 0° | 2.0458 |

Figure 2:
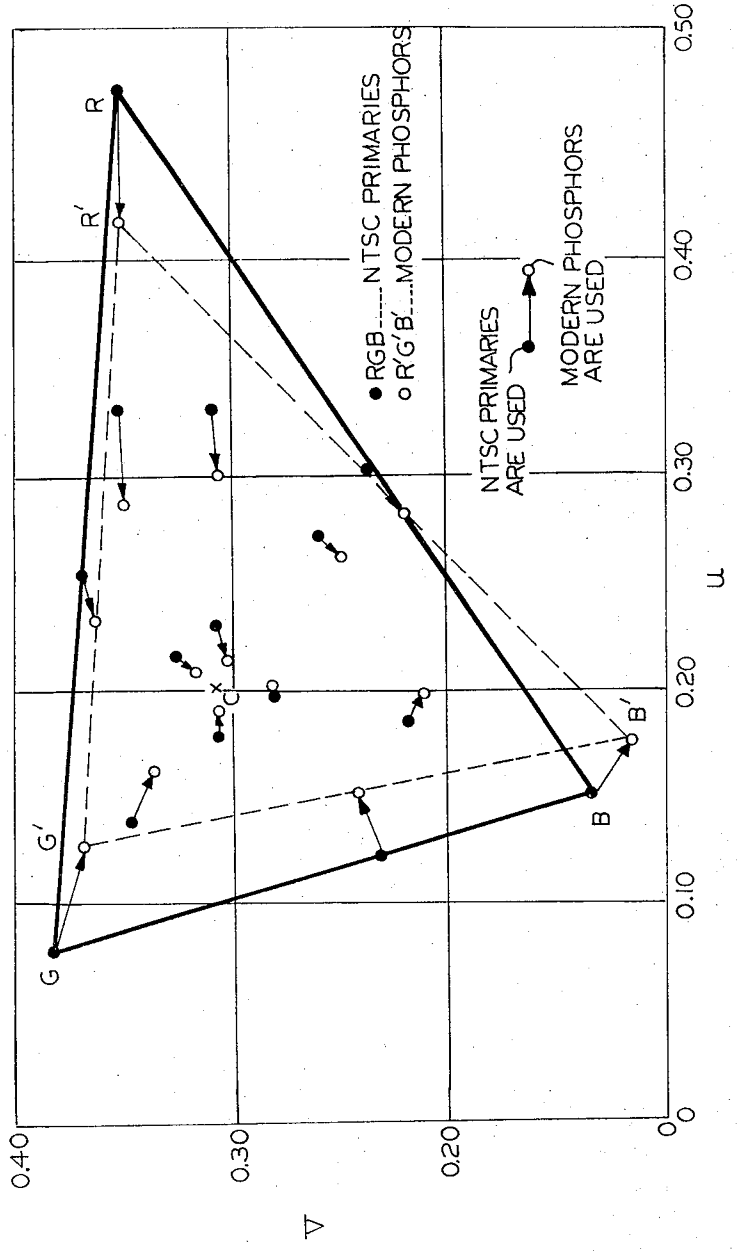
FIG. 2 is a chromaticity diagram showing chromaticities of NTSC primaries, present-day primaries and reproduced chromaticity errors.

In recent years, the luminous efficiencies of phosphors have been greatly improved, and this has resulted in a change in chromaticities. FIG. 2 shows the chromaticities of modern phosphors compared with those of NTSC primaries on a 1960CIE-uniform-chromaticity-scale (UCS) diagram. FIG. 2 also shows the chromaticity shifts of several colors when modern phosphors are used instead of NTSC primaries. It is seen from FIG. 2 that modern phosphors produce rather large chromaticity errors from the standard chromaticities.

These errors can be minimized by re-designing said demodulating block 30 in accordance with N. W. Parker's theory which is described in a paper entitled "An Analysis of the Necessary Decoder Corrections for Color Receiver Operation with non-standard Receiver Primaries" appearing in IEEE Transactions on Broadcast and Television Receivers, April 1966. The necessary demodulating axes and gains for modern phosphors are shown below. (These demodulators will be called "modern-phosphor-demodulators").

| | Axis | Gain |
|---|---|---|
| R-Y | 82° | 2.0494 |
| G-Y | 246° | 0.7461 |
| B-Y | 2° | 2.4347 |

Figure 3:
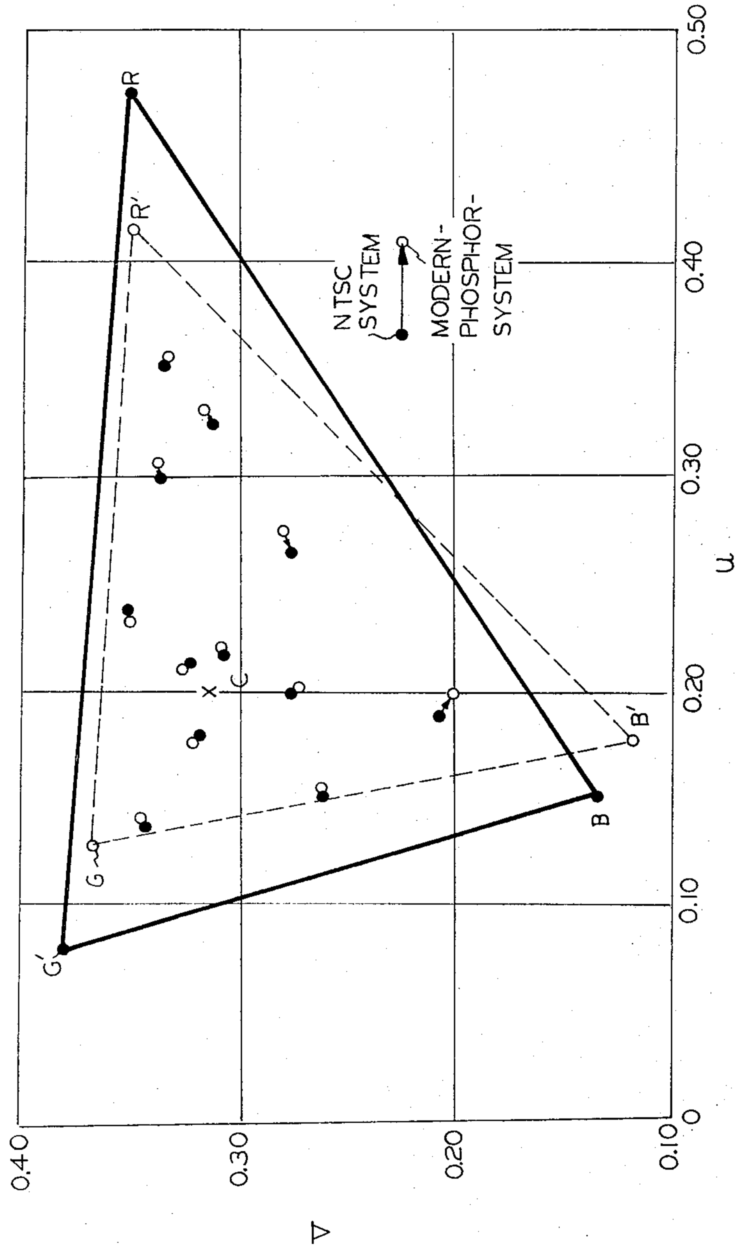
FIG. 3 is a chromaticity diagram showing chromaticity errors produced by a color reproducing system which reduces the chromaticity errors of FIG. 2.

FIG. 3 shows a comparison of chromaticities which are reproduced by two color reproduction systems, one of which, called a "modern-phosphor-system," utilizes modern phosphors and modern-phosphor-demodulators and the other of which, called an "NTSC-system," comprises NTSC primaries and NTSC demodulators. As compared with FIG. 2, the chromaticity errors are greatly reduced.

Figure 4:
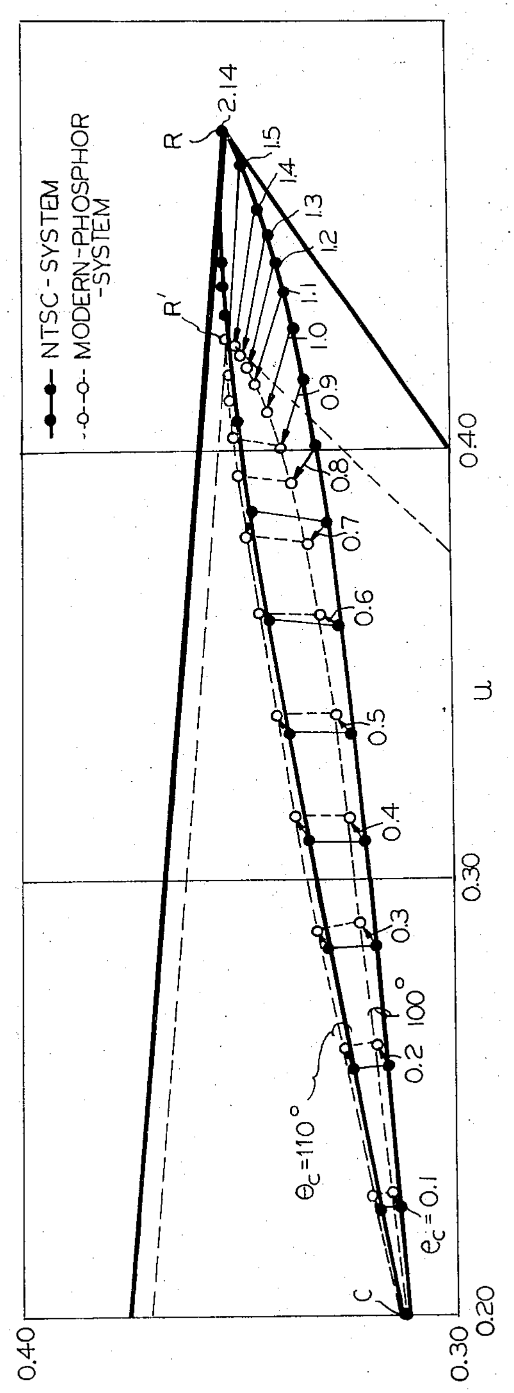
FIG. 4 is a enlarged view of part of FIG. 3.

FIG. 4 shows a enlarged view of the reddish region of the UCS diagram of FIG. 3.

The parameters $e_c$ and $\theta_c$ of FIG. 4 are defined as follows.

The NTSC composite video signal $E_M$ is expressed by equation (1).

$$E_M = E_Y + E_c \sin(2\pi fct + \theta_c) \quad (1)$$

where $E_Y$ is the amplitude of the luminance signal, $E_C$ is the amplitude of the chrominance subcarrier, $\theta_c$ is the phase angle of the chrominance subcarrier, $fc$ is the chrominance subcarrier frequency and $t$ is time. Equation 1 can be written as equation 2.

$$E_M = E_Y[1 + e_c \sin(2\pi fct + \theta_c)] \quad (2)$$

where $e_c = E_c/E_Y$ is called the normalized amplitude of the chrominance subcarrier. The saturation and the hue of reproduced colors are substantially determined by $e_c$ and $\theta_c$ respectively.

The modulated chrominance signal corresponding to the red color which is generated by a conventional color-bar generator has an $e_c$ of 2.14 and a $\theta_c$ of 103°. Referring to FIG. 4, it can be seen that pure red (i.e. saturated red), which has the chromaticity of NTSC red primary, is reproduced at $e_c = 2.14$ and $\theta_c = 100°(\approx 103°)$ in the NTSC-system. On the other hand, in the modern-phosphor-system, pure red which has the chromaticity of modern red phosphor is reproducible at a relatively smaller $e_c$ of 1.5, and no chromaticity change occurs in the red color in the region of larger $e_c$ values from 1.5–2.14. A greater $e_c$ than 2.14 at $\theta_c = 103°$ is not produced in an NTSC color television system, because no color can be transmitted the saturation of which is greater than NTSC red primary.

The transmitted NTSC signal contains color components of $2.14 \geqq e_c \geqq 0$ at $\theta = 103°$. In a modern-phosphor-system, however, a transmitted signal of $2.14 \geqq e_c > 1.5$ is no longer effective for color reproduction. Therefore, an $e_c$ of 1.5–2.14 ($\theta = 103°$) is unnecessary for color reproduction. On the contrary, an $e_c$ of 1.5–2.14 ($\theta = 103°$) causes serious defects in modern-phosphor-system for reasons which will be described below.

Figure 5:
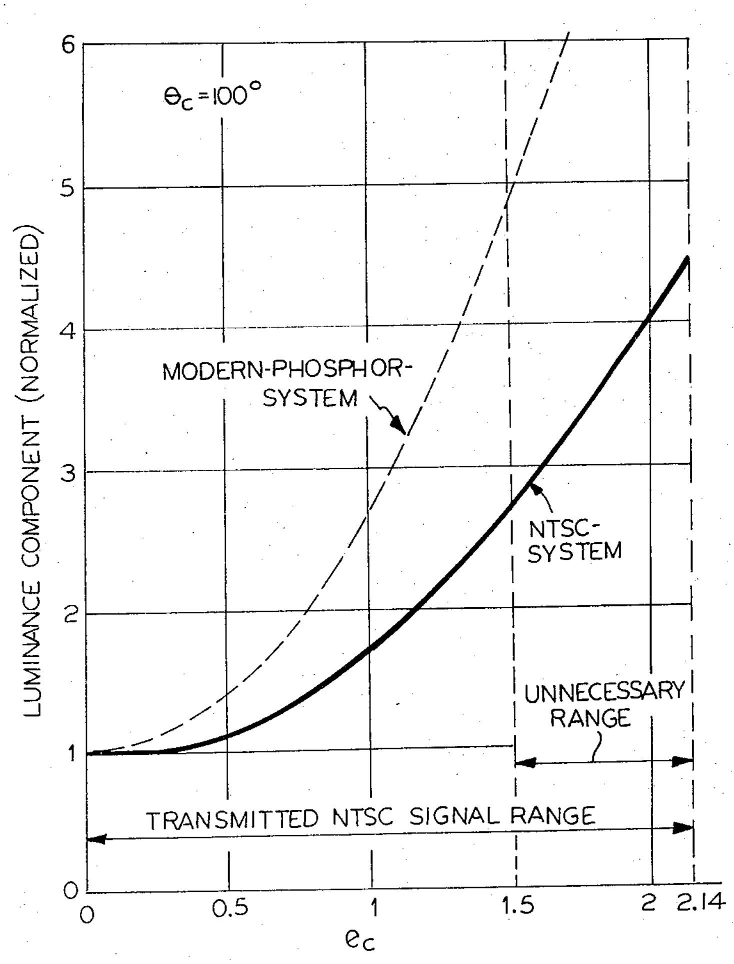
FIG. 5 is a graph showing luminance components carried by the chrominamce signal as a function of the normalized chrominance amplitude.

In the NTSC-system, if the gamma of a color picture tube, which represents the nonlinearity of the picture tube, is unity, the chrominance signal has no luminance components. (This is called the "Constant Luminance Principle"). Actually, however, because the gamma of the picture tube ranges from 2 to 3 depending on the operating conditions, the chrominance signal has some amount of luminance components. In a modern-phosphor-system, a larger amount of luminance components are carried by the chrominance signal than that in the NTSC system. FIG. 5 illustrates the luminance components carried by the chrominance signal in the near red portion (i.e. $\theta \approx 100°$) in both systems. The ordinate of FIG. 5 is normalized by the luminance component which is reproduced through the luminance channel. The luminance components carried by the chrominance signal in the NTSC-system are necessary for exact colorimetric reproduction. Therefore, the difference between the luminance components in a modern-phosphor-system from those in the NTSC system are luminance errors of reproduced color. It is seen from FIG. 5 that the larger the value of $e_c$, the greater are the luminance errors. In the range of $2.14 \geqq e_c > 1.5$, the luminance errors are extremely larger. These large luminance errors in the red color make the reproduced red much brighter than the original color being televised, and are perceived by viewers as extreme enhancement of the color. Moreover subjective sharpness of the red color images decreases because the luminance details reproduced through the wide-band luminance channel are hidden by the large luminance components transmitted through the narrowband chrominance channel. Therefore, the picture quality of the reproduced image containing rather saturated red color is greatly reduced in a conventional color television receiver.

In addition to the above, a most serious defect is caused by the unnecessary portion $e_c$ from 2.14 to 1.5, that is, a noise disturbance appearing in rather saturated red color portions of the picture, which is called the "Chroma Noise Disturbance."

Let it be assumed that the noise component $e_n(t)\sin[2\pi fct + \theta(t)]$ is added to the chrominance signal $e_c\sin(2\pi fct + \theta_c)$, where $e_n\,(t)$ is the instantaneous amplitude of the noise and $\theta\,(t)$ is the instantaneous phase angle of the noise. The expression for the noise component can be rewritten as follows;

$$e_n\sin[2\pi fct + \theta(t)] = e_i\sin(2\pi fct + \theta_c) + e_q\cos(2\pi fct + \theta_c) \qquad (3)$$

where $$\overline{e_i^2} = \overline{e_q^2} = \overline{e_n^2}/2$$

The first term of the right side of equation 3 is the in-phase noise component of the transmitted chrominance signal, and the second term is the out-of-phase noise component. Thus, the following resultant voltages are applied to said synchronous detectors 4, 5 and 6;

$$(e_c + e_i)\sin(2\pi\, fct + \theta_c) + e_q\cos(2\pi\, fct + \theta_c) \qquad (4)$$

If the relation of the normalized amplitude $e_c$ vs. the reproduced luminance components illustrated in FIG. 5 is denoted as $Y(e_c, \theta_c)$, a noise component $Y_n$ which is reproduced on the screen through the chrominance channel is;

$$Y_n = \left[\frac{\partial}{\partial e_c}\{Y(e_c, \theta_c)\}\right]_{e_c=e_c} X e_i + \left[\frac{\partial}{\partial e_c}\{Y(e_c, \theta_c+90°)\}\right]_{e_c=0} X e_q \qquad (5)$$

because of the smaller amplitudes of $e_i$ and $e_q$ as compared with $e_c$.

Figure 6:
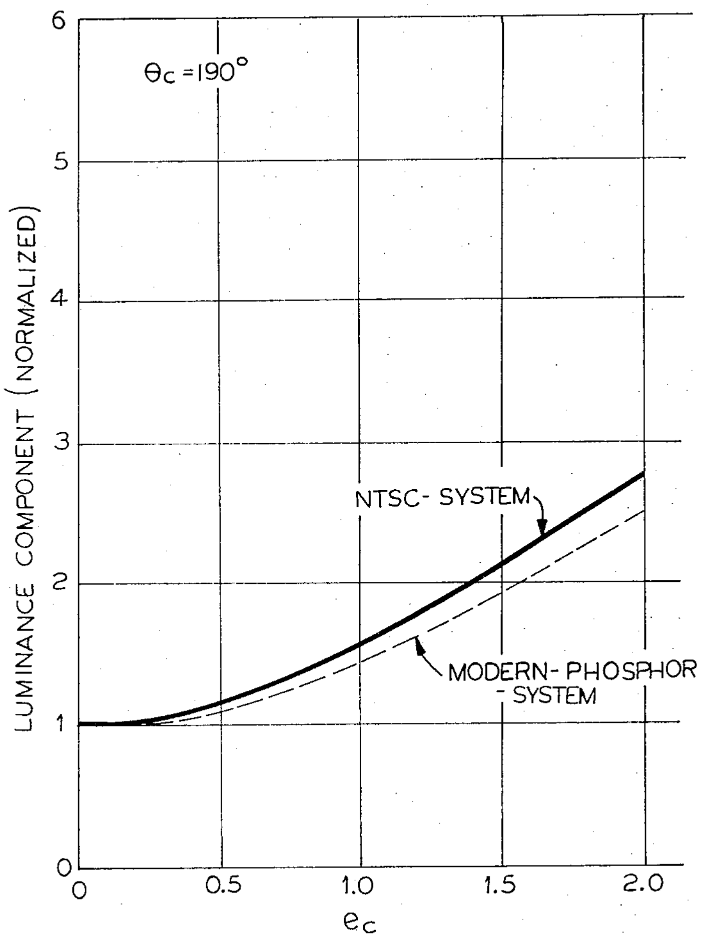
FIG. 6 is another graph showing luminance components carried by the chrominance signal.

FIG. 5 shows the relation $Y(e_c, \theta_c)$ where $\theta_c = 100°$. On the other hand, FIG. 6 shows the relation $Y(e_c, \theta_c)$ when $\theta_c = 190°$, i.e. the phase angle is at right angles to that of FIG. 5. From FIG. 6, the following expression can be written;

$$[\delta/\delta e_c\,\{Y(e_c, 190°)\}\,]_{e_c}0 = 0$$

Therefore, eq. (5) can be rewritten as follows;

$$Y_n = [\delta/\delta e_c\{Y(e_c, 100°)\}\,]_{e_c=e_c} \times e_i \qquad (6)$$

Eq. 6 indicates that the noise distrubance $Y_n$ is proportional to the gradient $\delta/\delta_{e_c}\{Y(e_c, 100°)\}$.

Therefore, the steeper the gradient of the curve Y of FIG. 5. the greater the noise disturbance reproduced through the chrominance channel (Chroma Noise Disturbance).

Referring to FIG. 5, it can be concluded that the Chroma Noise Disturbance is always greater in a modern-phosphor-system than in the NTSC-system, and severe Chroma Noise Disturbance is produced in the modern-phosphor-system when rather saturated red color (i.e. $e_c$>1.5) is transmitted.

From the above discussions, it becomes obvious that the unnecessary portion of the color-difference signal should be removed from the transmitted NTSC signal in a color television receiver which has a modern-phosphor-system to improve the operations thereof with respect to the annoying Chroma Noise Disturbances, subjective sharpness decreases and large luminance errors.

Although the foregoing discussion is in terms of the red colors, the same situations exist for the blue and green colors. In order to simplify the explanation, however, the red color problem is dealt with in the present specification.

The present invention is based upon the knowledge as set forth above.

Figure 7:
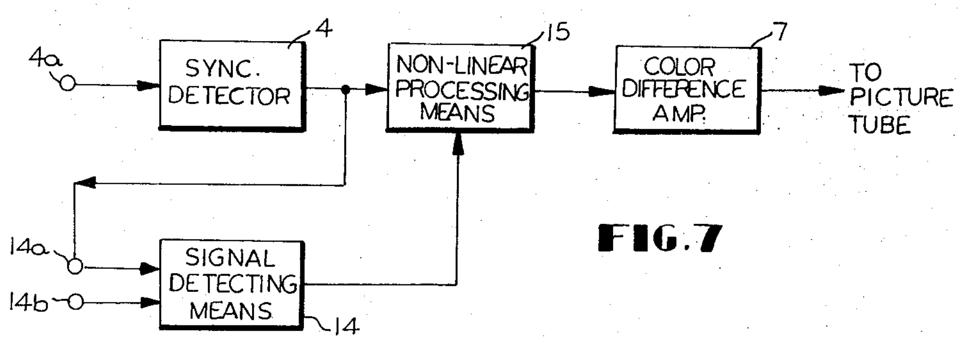
FIG. 7 is a block diagram of an embodiment of a picture quality improving apparatus according to the present invention.

FIG. 7 is a block diagram of an embodiment of the apparatus forming part of a television receiver according to the present invention. FIG. 7 shows the general idea upon which the present invention is based. The modulated chrominance signal is applied to said synchronous detector 4 through the input terminal 4*a*. Said synchronous detector 4 synchronously demodulates said modulated chrominance signal and produces said color-difference signal at the output terminal. Said color-difference signal is applied to a nonlinear processing means 15 which reduces the amplitude of said unnecessary color-difference signal portion. The signal detecting means 14 has two input terminals 14*a* and 14*b*, one input terminal 14*a* being supplied with the color-difference signal from the source of said color-difference signal such as said synchronous detector 4 and input terminal 14*b* being supplied with said luminance signal from the source of said luminance signal such as said video amplifier 2. Said signal detecting means detects the specific portion of said color-difference signal which produces annoying picture quality decreases described hereinbefore using one of or both of the color-difference signal and the luminance signal. The detected output signal of said signal detecting means 14 is applied to said nonlinear processing means 15 to cause said nonlinear processing means 15 to reduce the unnecessary amplitude of said color-difference signal. The output signal of said nonlinear processing means 15 is amplified by said color-difference amplifier 7 and fed to said color picture tube 10 for reproducing images with greatly improved picture quality.

Figure 8:
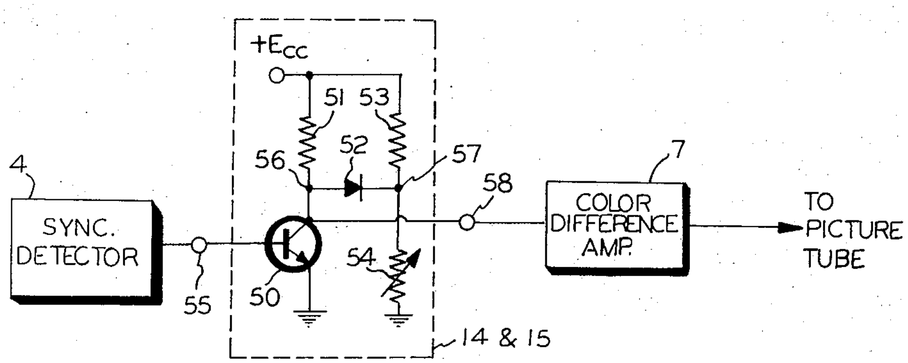
FIG. 8 is a circuit diagram of an embodiment according to the present invention.

FIG. 8 is a circuit diagram of a practical embodiment according to the present invention. The blocks which are identical with those of FIG. 7 are denoted with the same numerals. The block enclosed with dotted lines functions both as said signal detecting means 14 and said nonlinear processing means 15. The color-difference signal demodulated by said synchronous detector 4 is applied to the input terminal 55 and amplified by the transistor 50. The amplified color-difference signal appears across the load resistor 51.

Figure 9:
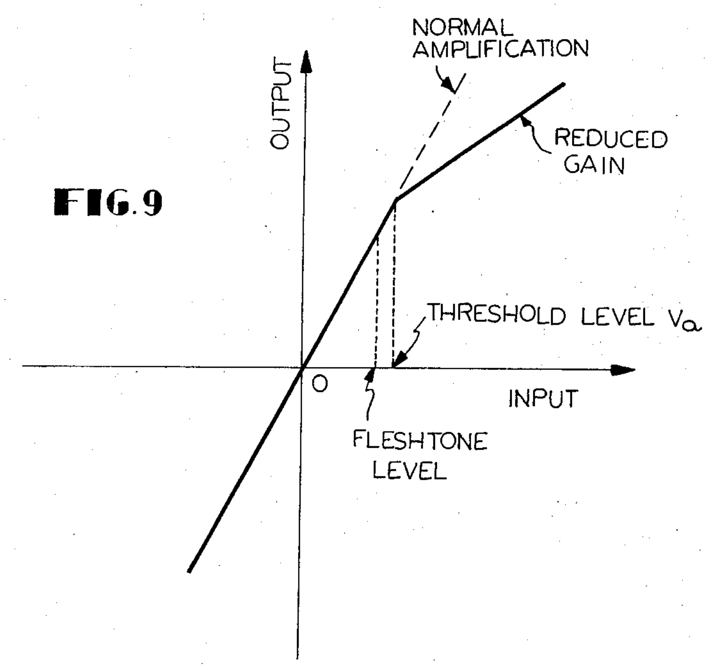
FIG. 9 is a graph showing the input-output relationship of FIG. 8.

The diode 52, which forms a well-known clipping circuit is connected between the collector electrode 56 of said transistor 50 and the junction 57 of the resistors 53 and 54 as illustrated. Said resistors 53 and 54 divide a source voltage $E_{cc}$ and produce a d-c voltage $V_a$ at said junction 57. If said color-difference signal voltage at said junction 56 is less than $V_a$, no current flows through said diode 52 and the normal amplification of said transistor 50 is maintained. If the color-difference signal voltage at said junction 56 exceeds $V_a$, said diode 52 turns "ON" and the amplification gain of said transistor 50 is reduced because the load resistor 51 is shunted by said resistor 53 and 54. As a result, the specific portion of said color-difference signal having a rather large amplitude is clipped for providing picture quality improvement. The threshold level $V_a$ is adjustable to the proper value by altering the resistance of said resistor 54. It is possible to control the amount of gain reduction, which is produced by conduction of said diode 52, by proper designing of said resistors 53 and 54. About 5–6 dB of gain reduction and a slightly higher threshold level for $V_a$ than a flesh-tone level are found to be preferrable for optimum operation. These relations are illustrated in FIG. 9.

Figure 10:
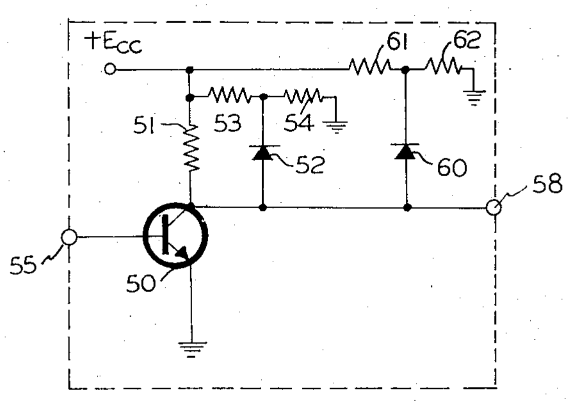
FIG. 10 is a circuit diagram of another embodiment according to the present invention.
Figure 11:
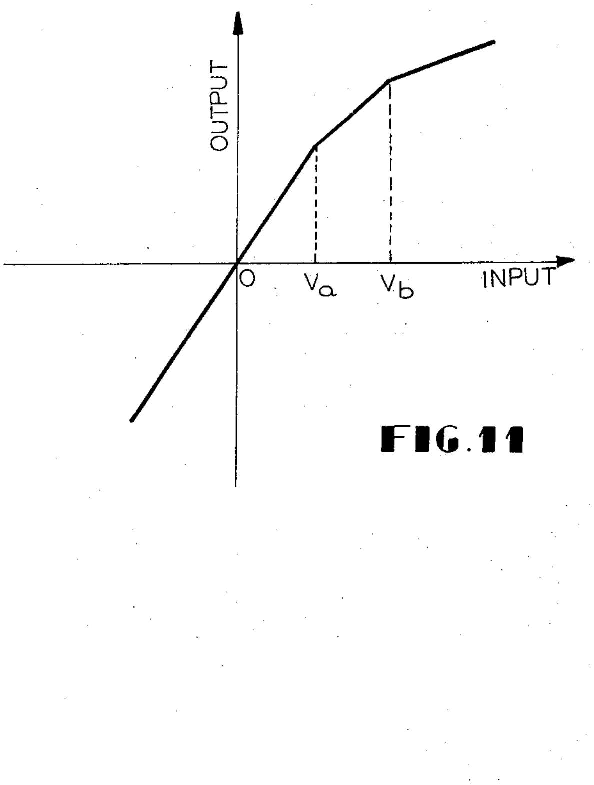
FIG. 11 is a graph showing the input-output relationship of FIG. 10.

FIG. 10 is a circuit diagram of another embodiment according to the present invention and the input-output relation of which is illustrated in FIG. 11. Detailed operational explanations are considered to be unnecessary, because of the similarity of operation of the two circuits shown in FIGS. 8 and 10. In FIG. 10, two clipping circuits are employed, one of which consists of the diode 52 and the resistors 53 and 54 having a threshold level $V_a$ and the other of which consists of the diode 60 and the resistors 61 and 62 having a threshold level $V_b$. With the circuit of FIG. 10, more smoothing and effective gain reduction is achieved to protect the reproduced image from degradations produced by abrupt gain reduction of FIG. 8.

The circuits shown in FIGS. 8 and FIG. 10 utilize no luminance signals to control the amplitude reduction of said color-difference signal. However, as seen from FIGS. 4 and 5, the amplitude reduction should be introduced when said normalized amplitude $e_c = E_C/E_Y$ instead of when the unnormalized amplitude $E_c$ exceeds the specific threshold value. To achieve an operation which is theoretically more accurate, it is necessary to detect $e_c$ instead of $E_c$.

Figure 12:
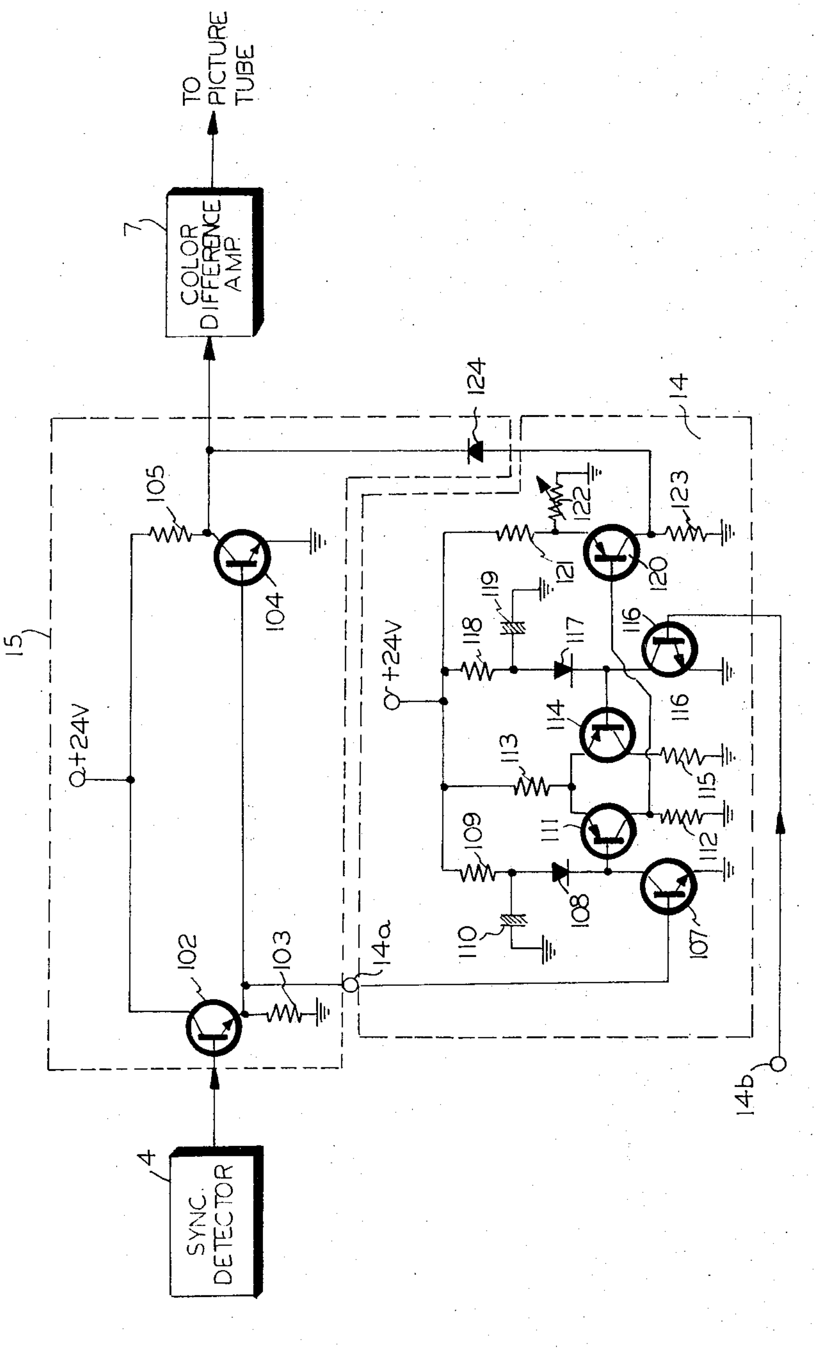
FIG. 12 is a circuit diagram of a further embodiment according to the present invention.

In FIG. 12, there is shown a circuit diagram of another embodiment according to the present invention which detects said normalized amplitude $e_c$. It should be noted that said normalized subcarrier amplitude $e_c$ can be replaced with the normalized color-difference signal such as $(E_R–E_Y)/E_Y$ because $E_C$ corresponds to $(E_R–E_Y)$, where $(E_R–E_Y)$ and $E_Y$ denote the (R–Y) color-difference signal and the luminance signal respectively. Said synchronous detector 4 produces said (R–Y) color-difference signal which is fed to a first stage of a two stage amplifier constituting the non-linear processing means 15, the first stage being composed of the transistor 102 and the resistor 103 connected to the emitter thereof. A transistor 104 forms the second stage and amplifies said color difference signal which is fed from the collector thereof to said color picture tube 10 through said color-difference amplifier 7 in a conventional way. The color-difference signal from the first stage of the amplifier is fed to the transistor 107 of the signal detecting means 14 through the input terminal **14*a*. Said transistor 107 makes the current which is flowing through the diode 108 connected to the collector of transistor 107** proportional to said color-difference signal $(E_R–E_Y)$. It is possible to approximate the relation between the current I flowing through a diode and the voltage V appearing across the diode as follows;

$$V = k_0 \log I + k_1$$

where $k_0$, $k_1$ are constants. The voltage $V_1$ across said diode (108) is;

$$V_1 = k_0 \log(E_R - E_Y) + k_1$$

On the other hand, the luminance signal $E_Y$ is applied to the base electrode of a transistor 116 through the input terminal **14*b*. The voltage $V_2$ appearing across a diode 117 connected to the collector of transistor 116** is;

$$V_2 = k_0 \log E_Y + k_1$$

In this case, the current-voltage relations of said diodes 108 and 117 are assumed to be identical. The resistors 109 and 118 protect said diodes 108 and 117 and said transistors 107, 116 from over-current destruction. The capacitors 110 and 119 are decoupling capacitors. The transistors 111, and 114 and the resistors 112, 113 and 115 are connected between the transistors 107 and 116 to form a differential amplifier which produces a difference voltage proportional to $(V_2–V_1)$ at the collector electrode of said transistor 111. Therefore, the voltage appearing at the collector of said transistor 111 can be expressed as follows;

$$\alpha(V_2 - V_1) = \alpha k_0 \log(E_R - E_Y)/E_y$$

where $\alpha$ is a constant representing the differential amplifier gain. The voltage $\alpha(V_2 - V_1)$ is applied to the transistor 120. Resistors 121 and 122 are coupled between a supply voltage and the emitter electrode of transistor 120 to supply a bias voltage $V_a$, which is the threshold voltage, to the emitter electrode of said transistor 120. Because said transistor 120 is a pnp type, when the base voltage of said transistor 120, which consists of the signal $\alpha(V_2 - V_1)$ and a base-bias d-c voltage, becomes lower than said threshold level $V_a$, said transistor 120 goes into the active operation region and amplifies the input signal. The base bias voltage of said transistor 120 is chosen so that said transistor 120 goes into the active region when the absolute value $|\alpha(V_2 - V_1)|$ exceeds the specific threshold level. As the absolute value $|\alpha(V_2 - V_1)|$ equals $\alpha k_0 \log\{(E_R - E_Y)/E_Y\}$, said transistor 120 detects the larger portion of $\log\{(E_R - E_Y)/E_Y\}$ than the specific threshold level. It is preferred that said threshold level correspond to the specific normalized amplitude of $e_c$ of about 1.5 for example.

As the gain of said transistor 120 is designed to be large, said transistor 120 switches immediately to the "ON" condition which means that the transistor is in the saturated state if said transistor 120 is driven beyond the threshold value $V_a$. Thus, the voltage of the collector electrode of said transistor 120 becomes a positive voltage $V_{ON}$. In any other case, the collector voltage of said transistor is a zero voltage. The diode 124 is reversely biased when said collector voltage of said transistor 120 is zero and produces no effect on said transistor 104. If said collector voltage becomes $V_{ON}$, said diode 124 conducts, producing a decrease in the amplification gain of said transistor 104 due to the parallel connection of the load resistors 105 and 123. Thus, the desired amplitude reduction of said color-difference signal is achieved when $\{(E_R - E_Y)/E_Y\}$, which is when $e_c$ exceeds the specific value.

Figure 13:
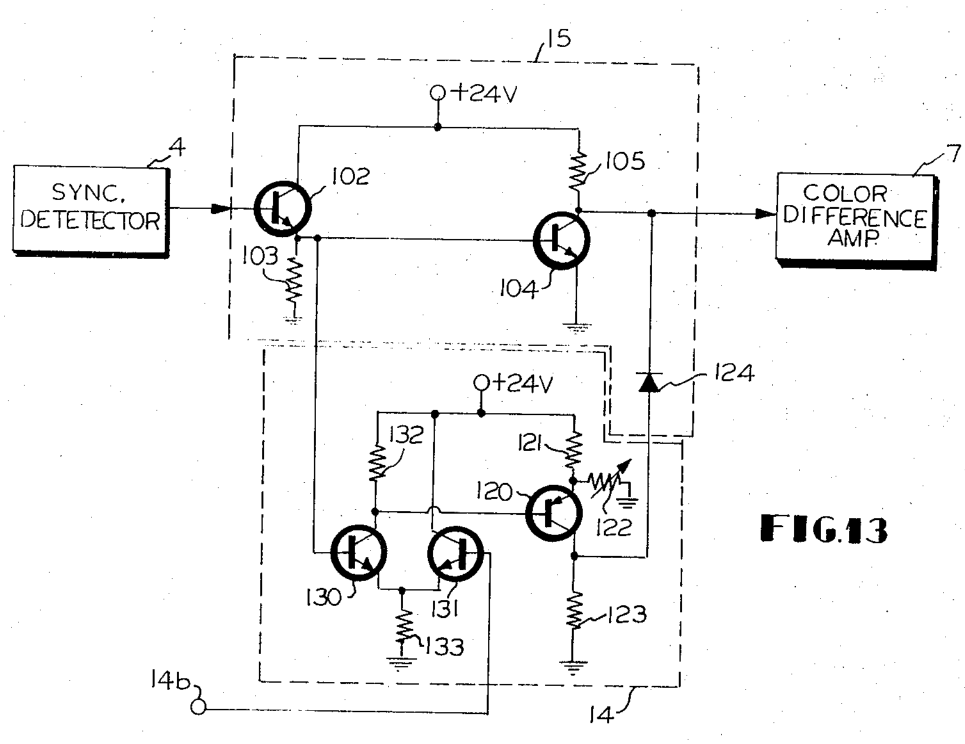
FIG. 13 is a circuit diagram of a still further embodiment according to the present invention.

The circuit shown in FIG. 12 theoretically provides a complete control system, but is rather complicated. FIG. 13 is a block diagram of another embodiment according to the present invention which is less complicated.

It can easily be understood that a larger $(E_R - E_Y)$ and a smaller $E_Y$ makes the value $\{(E_R - E_Y)/E_Y\}$ larger, and conversely a smaller $(E_R - E_Y)$ and a larger $E_Y$ yield a smaller $(E_R - E_Y)/E_Y$. Therefore the value $\{(E_R - E_Y) - E_Y\}$ can be used instead of $\{(E_R - E_Y)/E_Y\}$ for detecting the portion of the signal which controls said nonlinear processing circuit. The circuitry shown in FIG. 13 is based upon the above principle. The blocks and elements in FIG. 13, the operations of which are identical with those in FIG. 12, are denoted by the same numerals, and the explanation thereof is omitted.

The circuit of FIG. 13 has transistors 130 and 131 similar to transistors 107 and 116 connected in a configuration which omits transistors 111 and 114 of the differential amplifiers.

The transistor 130 receives said color-difference signal $(E_R - E_Y)$ from the transistor 102. The transistor 131 is supplied with said luminance signal $E_Y$ through said input terminal 14*b*. Said transistors 130 and 131 and the resistors 132 and 133 are coupled together directly to a differential amplifier which produces the difference signal $-\alpha\{(E_R - E_Y) - E_Y\}$ at the collector electrode of said transistor, where $\alpha$ is a constant. The pnp-type transistor 120 turns "ON" when the absolute value $|\alpha\{E_R - E_Y) - E_Y\}|$ exceeds the specific threshold value determined by the resistors 121 and 122 as explained in detail relating to FIG. 12. The turning "ON" of said transistor 120 causes the diode 124 to conduct. Then the load resistor 105 of the transistor 104 is shunted by the resistor 123 and the amplification gain of said transistor 104 is reduced. The desired amplitude reduction is accomplished in this way.

Figure 14:
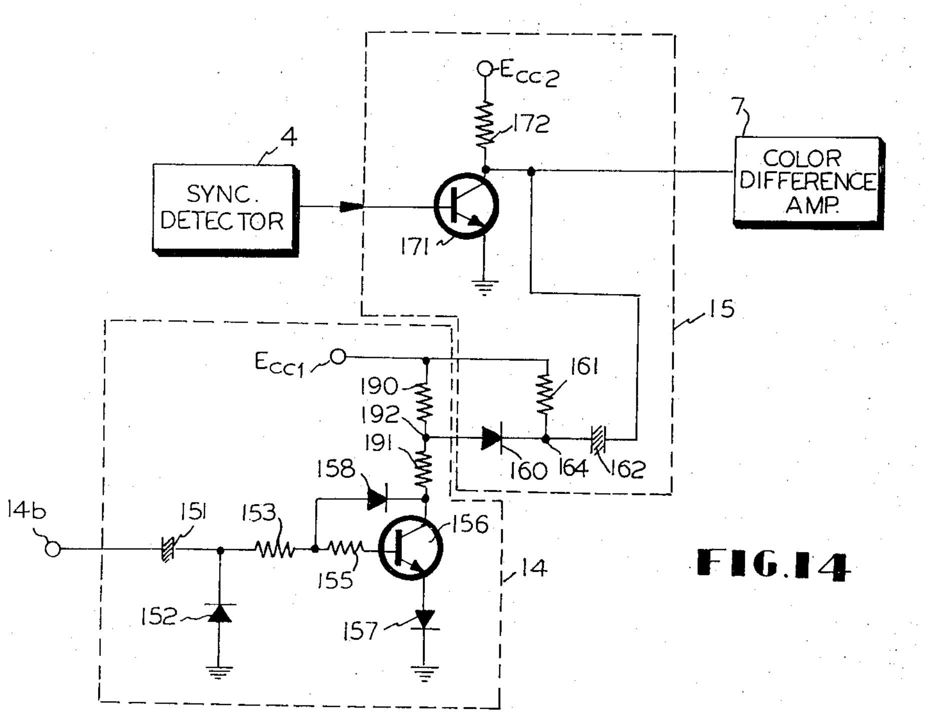
FIG. 14 is a circuit diagram of a still further embodiment according to the present invention.

FIG. 14 is a circuit diagram of another embodiment according to the present invention. The transistor 171 of the non-linear processing 15 receives said (R-Y) color-difference signal from said synchronous detector 4. The collector electrode of said transistor 171 is connected through a resistor 172 to a voltage source *Ecc* 2 and to the diode 160 and the resistor 161 through the coupling capacitor 162. The resistance of said resistor 161 is very large, so that the load resistance of said transistor 171 is considered to be that of said resistor 172 alone, when said diode 160 does not conduct. A transistor 156 in the signal detecting means has the base connected through resistors 153 and 155 and capacitor 151 to terminal 146, and has the collector electrode connected through resistors 190 and 191 to source voltage Ecc 1, which is also connected to resistor 161, diode 160 is connected to junction 192 between resistors 190 and 191. The emitter electrode of transistor 156 is grounded through diode 157. If the transistor 156 is in the "OFF" state, the d-c voltages at the junctions 164 and 192 are identical with the source voltage *Ecc* 1. As said silicon diode 160 has a threshold voltage of about 0.7V, said diode 160 does not conduct when the color-difference signal appearing at the junction 164 is positive-going or slightly negative-going. On the other hand, said diode 160 conducts when a negative-going color-difference signal larger than said threshold value is applied to said junction 164. In this case, said resistor 172 is shunted by said resistor 190 and the amplification gain of said transistor 171 is reduced. This operation is similar to that of FIG. 8.

The luminance signal with a sync. pulse is applied to the input terminal 14*b*. Let it be assumed that the polarity of the sync. pulse is negative-going. The capacitor 151 and the diode 152 coupled to ground between capacitor 151 and resistor 153 form a clamping circuit which restores the d-c component of said luminance signal. Said luminance signal is fed to the transistor 156 through the resistors 153 and 155. The resistor 153 isolates said clamping circuit from the next stage for providing accurate operation of said clamping circuit. Said transistor 156 acts as a high-gain amplifier with the load resistors 190 and 191 and the biasing diode 157. Said diode 157 plays the role of a threshold element together with the base-emitter junction of said transistor 156. When the luminance signal applied to the base electrode of said transistor 156 exceeds the threshold level of said threshold element, said transistor 156 turns "ON" because the amplifier consisting of said transistor 156 is designed to be a high-gain amplifier. Then, the collector voltage of said transistor 156 reaches about zero volts. Then, the voltage of the anode electrode 192 of said diode 160 goes down, and said diode 160 becomes reversely biased. This means that the threshold level of said diode 160 becomes greater which prevents said diode 160 from being conductive even if a large negative color-difference signal is applied to the cathode electrode 164 of said diode 160. The diode 158 together with the resistor 155 guards said transistor 156 against over-saturation in a conventional manner. Because said transistor 156 turns "ON" when the luminance signal is larger than the specific threshold level, the operation of said diode 160 is as follows;

| Color-difference signal | Luminance signal | Diode 160 |
|---|---|---|
| Negatively Large | Small | ON |
| | Large | OFF |
| Negative Small or Positive | Small | OFF |
| | Large | OFF |

As seen from above discussions, said diode 160 turns "ON" only when said color-difference signal has a large negative amplitude and said luminance signal has a small amplitude. Therefore, the amplitude reduction of said color-difference signal is accomplished when the reproduced scene has relatively dark luminance (which corresponds to a small luminance signal) and rather saturated red color. (This is because the negative-going color-difference signal at said junction 164 increases the red beam current in the picture tube due to the polarity-reversing effect of said color-difference amplifier 7. This polarity-reversing effect has been neglected in the discussion of FIGS. 8 and 10 for the convenience of explanation.) In this manner, the specific portion of the large value of $e_c$ (which corresponds to a large $(E_R - E_Y)/E_Y$ or large $\{E_R - E_Y) - E_Y\}$) is detected effectively and more easily.

As shown in detail hereinbefore, the apparatus according to the present invention provides effective chroma noise reduction, elimination of luminance error and improvement in the decrease of sharpness occuring in rather saturated color portions of an image in a conventional color television receiver.

The apparatus shown hereinbefore is applicable not only to the (R-Y) color-difference channel but also to the (G-Y) and the (B-Y) channels. Moreover, although the foregoing description is limited to the NTSC system, the apparatus can be adopted to other color television systems such as the PAL and SECAM systems.

It is intended that all matter contained in the foregoing description and in the drawings shall be interpreted as illustrative only, not as limitative, of the invention.

The embodiments of the invention in which an exclusive property or privilege is claimed are defined as follows:

1. A picture quality improving apparatus for a color television receiver comprising signal detecting means having two input terminals, one of which is adapted to be connected to the source of the color-difference signal in the receiver to be supplied with the color-difference signal, the other of which is adapted to be connected to the source of the luminance signal in the receiver to be supplied with the luminance signal, said signal detecting means including detecting means for detecting a specific portion of said color-difference signal which reproduces a high-saturation color on the screen, and control signal producing means for producing a control signal when said specific portion is detected, and nonlinear processing means with two input terminals, one of which is adapted to be connected to the source of the color-difference signal to be supplied with said color-difference signal, the other of which is connected to said signal detecting means and is supplied with said control signal, said non-linear processing means being for reducing the amplitude of said color-difference signal in response to said control signal.

2. A picture quality improving apparatus as claimed in claim 1, wherein said detecting means of said signal detecting means is for detecting a specific portion of the amplitude of said color-difference signal which is larger than a predetermined threshold level.

3. A picture quality improving apparatus as claimed in claim 1, wherein said detecting means of said signal detecting means consists of a first means which produces a normalized color-difference signal by dividing said color-difference signal by said luminance signal and a second means coupled to said first means which detects the portion of said normalized color-difference signal having an amplitude larger than a predetermined threshold level.

4. A picture quality improving apparatus as claimed in claim 1, wherein said detecting means of said signal detecting means consists of a first means which produces a difference signal between said color-difference signal and said luminance signal and second means coupled to said first means which detects a specific portion of said difference signal which has an amplitude larger than a predetermined threshold level.

5. A picture quality improving apparatus as claimed in claim 1, wherein said detecting means of said signal detecting means is for detecting a specific portion of said luminance signal which has an amplitude larger than a predetermined threshold level, said nonlinear processing means having a different threshold level and comprises means for reducing the amplitude of said color-difference signal which exceeds said different threshold level when said control signal is not produced, and for preventing said amplitude reduction of said color-difference signal due to increasing effect of said different threshold level caused by said control signal when said control signal is applied.

6. A picture quality improving apparatus as claimed in claim 1, wherein said nonlinear processing means consists of means for shunting the load resistor of a color-difference amplifier in response to said control signal.

7. A picture quality improving apparatus as claimed in claim 1, wherein said nonlinear processing means and said signal detecting means comprise clipping circuits.

* * * * *